(No Model.)  J. O. AYO.  2 Sheets—Sheet 1.
DREDGING BUCKET.

No. 277,868.  Patented May 22, 1883.

WITNESSES
F. L. Ourand.
J. Heylmun.

INVENTOR
Jos. O. Ayo.
by Heylmun & Kauz
Attorneys (No Model.) 2 Sheets—Sheet 2.

J. O. AYO.
DREDGING BUCKET.

No. 277,868. Patented May 22, 1883.

UNITED STATES PATENT OFFICE.

JOSEPH O. AYO, OF NEAR HOUMA, LOUISIANA.

DREDGING-BUCKET.

SPECIFICATION forming part of Letters Patent No. 277,868, dated May 22, 1883.

Application filed March 21, 1883. (No model.)

*To all whom it may concern:*

Be it known that I, JOSEPH O. AYO, a citizen of the United States of America, residing near Houma, in the parish of Terre Bonne and State of Louisiana, have invented certain new and useful Improvements in Dredging-Buckets; and I do hereby declare the following to be a full, clear, and exact description of the invention, such as will enable others skilled in the art to which it appertains to make and use the same.

Figure 1:
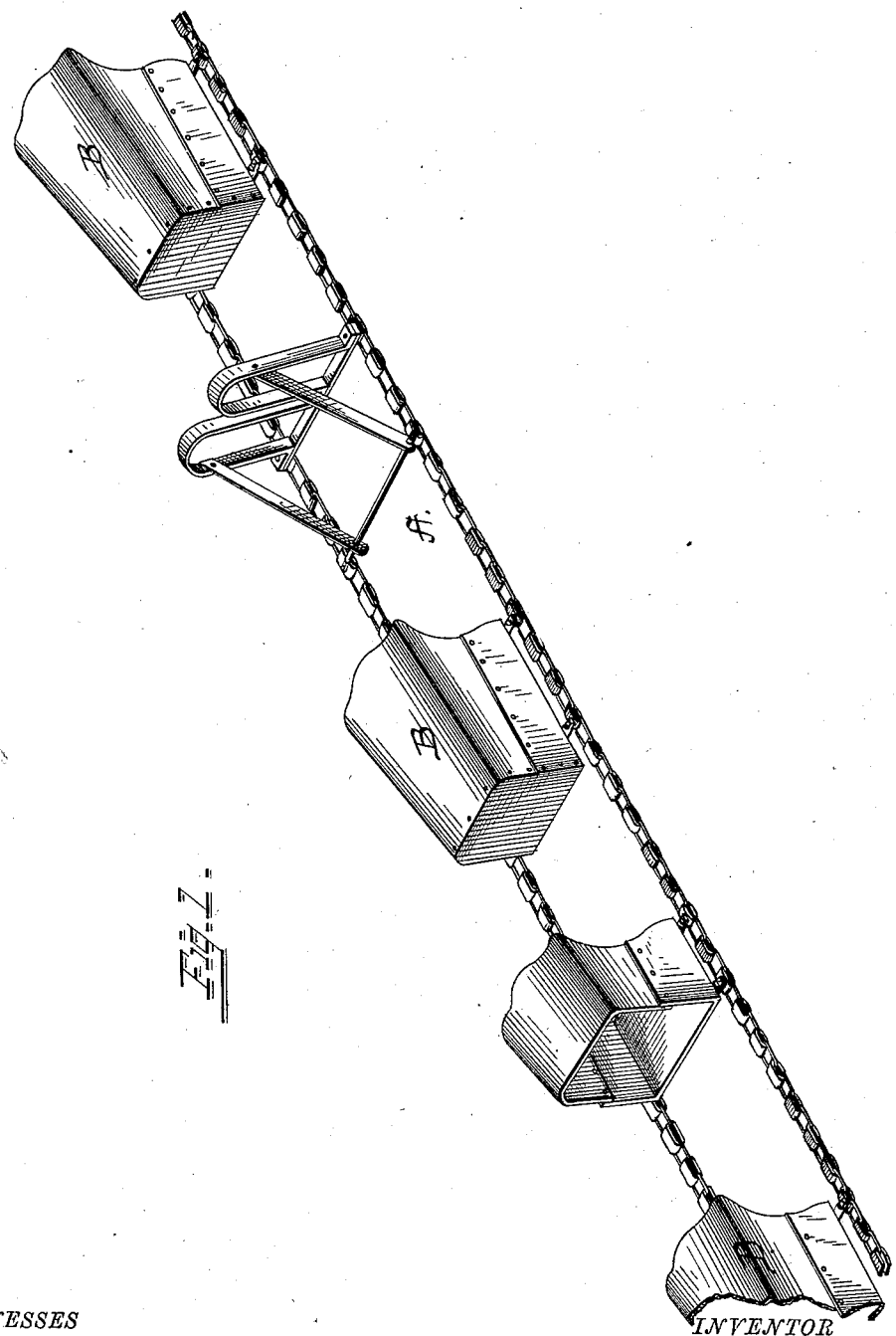
Figure 2:
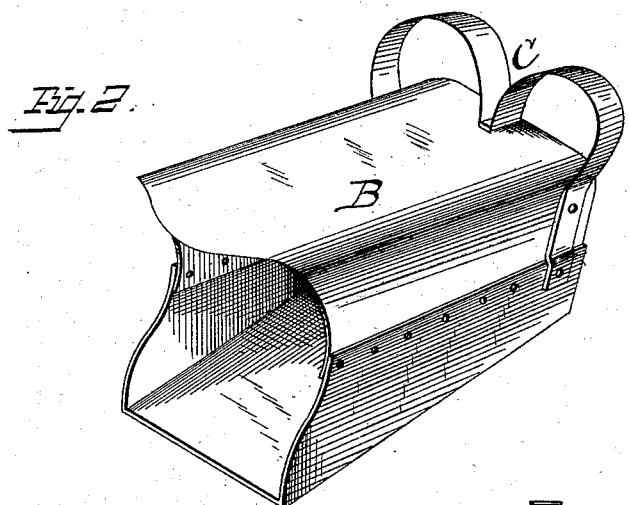
Figure 3:
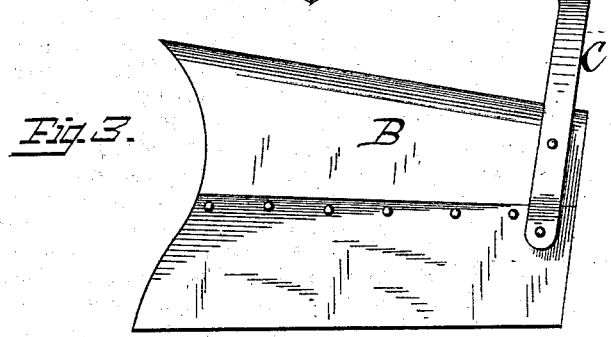
Figure 4:
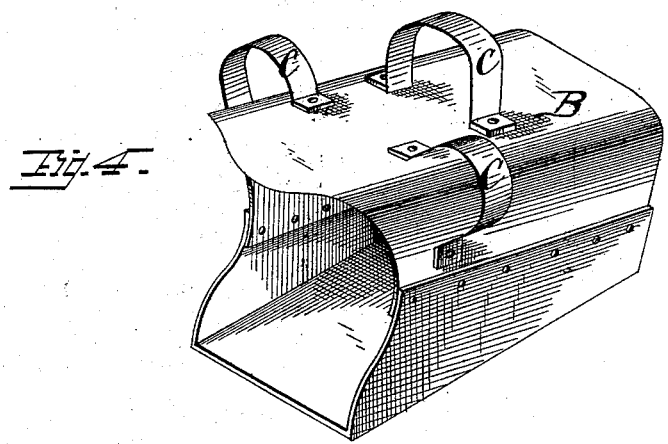

Figure 1 is a perspective view of a portion of an endless chain with several dredging-buckets attached, showing my improvements. Fig. 2 is a perspective view of a dredging-bucket, showing my improvements applied thereto. Fig. 3 is a side view of the same; and Fig. 4 is a perspective view of a dredging-bucket, showing a modification of the improvements.

This invention relates to certain improvements in buckets for dredging-machines, especially of the endless bucket-train class; and the main object of the improvement is to provide each bucket with one or more cutters, or their equivalents, secured to the sides (or to the sides and top) near the bottom of the bucket, so as to project a short distance above the upper or outer surface of the bucket, to serve as cutters when coming in contact with logs or other obstructions, and also to loosen the soil for the following bucket.

My invention consists in a dredging-bucket having one or more transverse cutters attached to the sides, or to the sides and top thereof, as will be hereinafter described.

My invention further consists in the combination of an endless chain or its equivalent, scoop-buckets, and transverse cutters, as will be hereinafter more fully set forth.

In the annexed drawings, A represents an endless chain for a dredging-machine, provided with a series or train of scoop-buckets, B, properly secured by suitable means. These buckets may be of any known class, preference, however, being given to those used in Menge's dredging-machines.

To the outer front surface of each bucket is secured transversely by rivets or other means a curved bar, C, with its upper end sharpened to form a cutting-edge. The bar C, which is preferably made of steel and of a suitable thickness and width, may be made with a single curve, as seen in Fig. 1 of the drawings, or made with two loops, as seen in Fig. 2 of the drawings; or the curved single bars may be arranged on the surface of the bucket, as seen in Fig. 4 of the drawings. These cutters should extend beyond the bucket-surface about one and one-half or two inches, and are preferably arranged at or near the bottom of the bucket, so as not to materially interfere with the operation of the bucket while scooping, since they are specially intended for acting upon the material or obstructions below the path of the circle traversed by the buckets.

It will be noticed that when motion is communicated to the endless chain carrying the buckets, to excavate, the first or leading bucket will come in contact with the soil, fill or charge the same, and the cutters thereof will cut or loosen the soil for the following bucket, and thereby prevent the clogging of the soil in the other buckets. These cutters will also serve as gouges in cutting out portions of stumps or logs that may be in their path.

It is obvious to those skilled in the art that the foregoing improvement can be applied to the dipper-bucket such as is used on the Osgood and other dredgers to produce substantially the same result; also that cutters C may be connected directly to the endless chain between the buckets, substantially as seen in Fig. 1 of the drawings, to obtain substantially the same result.

I reserve the right to vary the construction and arrangement of parts without departing from the spirit of the invention herein described.

What I claim as my invention, and desire to secure by Letters Patent, is—

1. A dredging-bucket having one or more transverse cutters attached to the sides, or to the sides and top thereof, substantially as described.

2. A dredging-bucket provided with a cutter arranged transversely as to the length of the bucket, with an intermediate space between the bucket and cutter, substantially as described.

3. The combination of an endless chain or its equivalent, scoop-buckets, and transverse cutters, substantially as described, and for the purposes set forth.

In testimony whereof I affix my signature in presence of two witnesses.

JOSEPH O. AYO.

Witnesses:
  H. M. WALLIS, Jr.,
  A. ROVIRA.